United States Patent

Kawashima

[19]

[11] Patent Number: 5,970,162
[45] Date of Patent: Oct. 19, 1999

[54] IMAGE INPUT SYSTEM HAVING IMAGE PICKUP DEVICE CAPABLE OF MIRROR-DIRECTION PANNING

[75] Inventor: Masanori Kawashima, Yokosuka, Japan

[73] Assignee: Canon Kabushiki Kaisha, Tokyo, Japan

[21] Appl. No.: 08/961,224

[22] Filed: Oct. 30, 1997

Related U.S. Application Data

[63] Continuation of application No. 08/455,711, May 31, 1995, abandoned.

[30] Foreign Application Priority Data

Jun. 3, 1994 [JP] Japan ................................ 6-122271
Mar. 31, 1995 [JP] Japan ................................ 7-075788

[51] Int. Cl.$^6$ .............................. G06K 9/00; G06K 9/32; H04N 7/14
[52] U.S. Cl. ............................. 382/103; 382/295; 348/15
[58] Field of Search .................................. 382/103, 151, 382/295; 348/15

[56] References Cited

U.S. PATENT DOCUMENTS 4,203,102  5/1980  Hydes ...................................... 340/723
5,438,357  8/1995  McNelley ................................... 348/15
5,479,203  12/1995  Kawai et al. ............................. 348/15
5,515,099  5/1996  Cortjens et al. .......................... 348/15

Primary Examiner—David K. Moore
Assistant Examiner—Monica S. Davis
Attorney, Agent, or Firm—Fitzpatrick, Cella, Harper & Scinto

[57] ABSTRACT

An image input system includes: an image pickup device movable at least from side to side; an image pickup direction designating device for designating the direction of movement at least from side to side of the image pickup device; a display form switching device for switching a display form for an image picked up by the image pickup device between two display forms: a real image display form in which the image is displayed as it is and a mirror image display form in which the image is displayed reversed left to right; and a control direction changing device which, when the display form is switched by the display form switching device, changes the correspondence of the designation regarding the direction of movement from side to side, given by the image pickup direction designating device, and the direction of movement from side to side effected in response to the designation.

16 Claims, 17 Drawing Sheets

FIG. 2(A)
| IMAGE PICKUP DIRECTION CONTROL KEY | IMAGE PICKUP SECTION SWINGING DIRECTION |
|---|---|
| "LEFT" KEY | LEFTWARD |
| "RIGHT" KEY | RIGHTWARD |
| "UP" KEY | UPWARD |
| "DOWN" KEY | DOWNWARD |
FIG. 2(B)
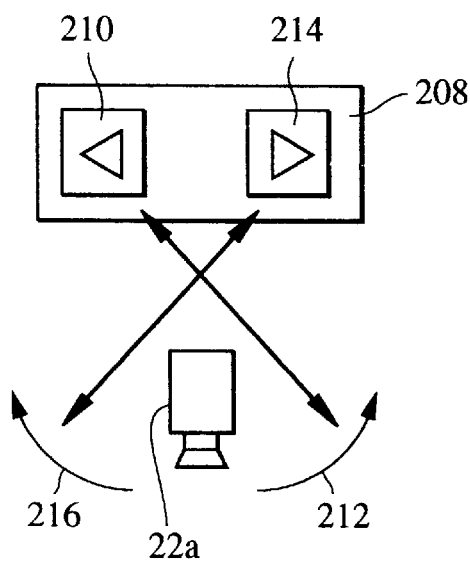
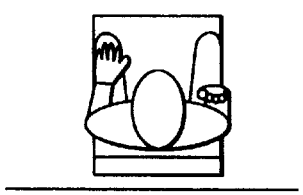

FIG. 3(A)
| IMAGE PICKUP DIRECTION CONTROL KEY | IMAGE PICKUP SECTION SWINGING DIRECTION |
|---|---|
| "LEFT" KEY | RIGHTWARD |
| "RIGHT" KEY | LEFTWARD |
| "UP" KEY | UPWARD |
| "DOWN" KEY | DOWNWARD |
FIG. 3(B)
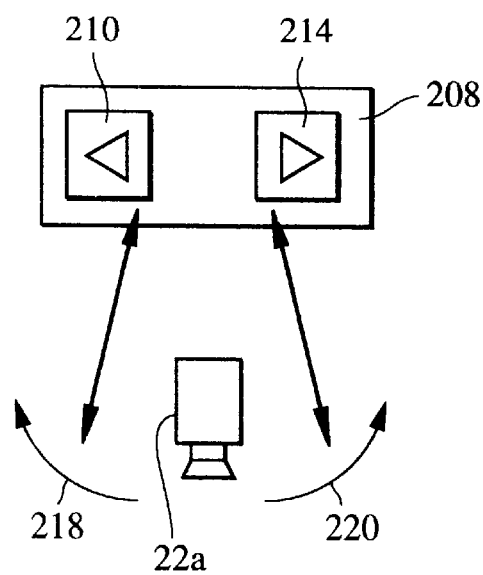
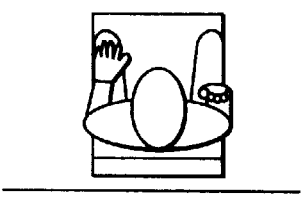

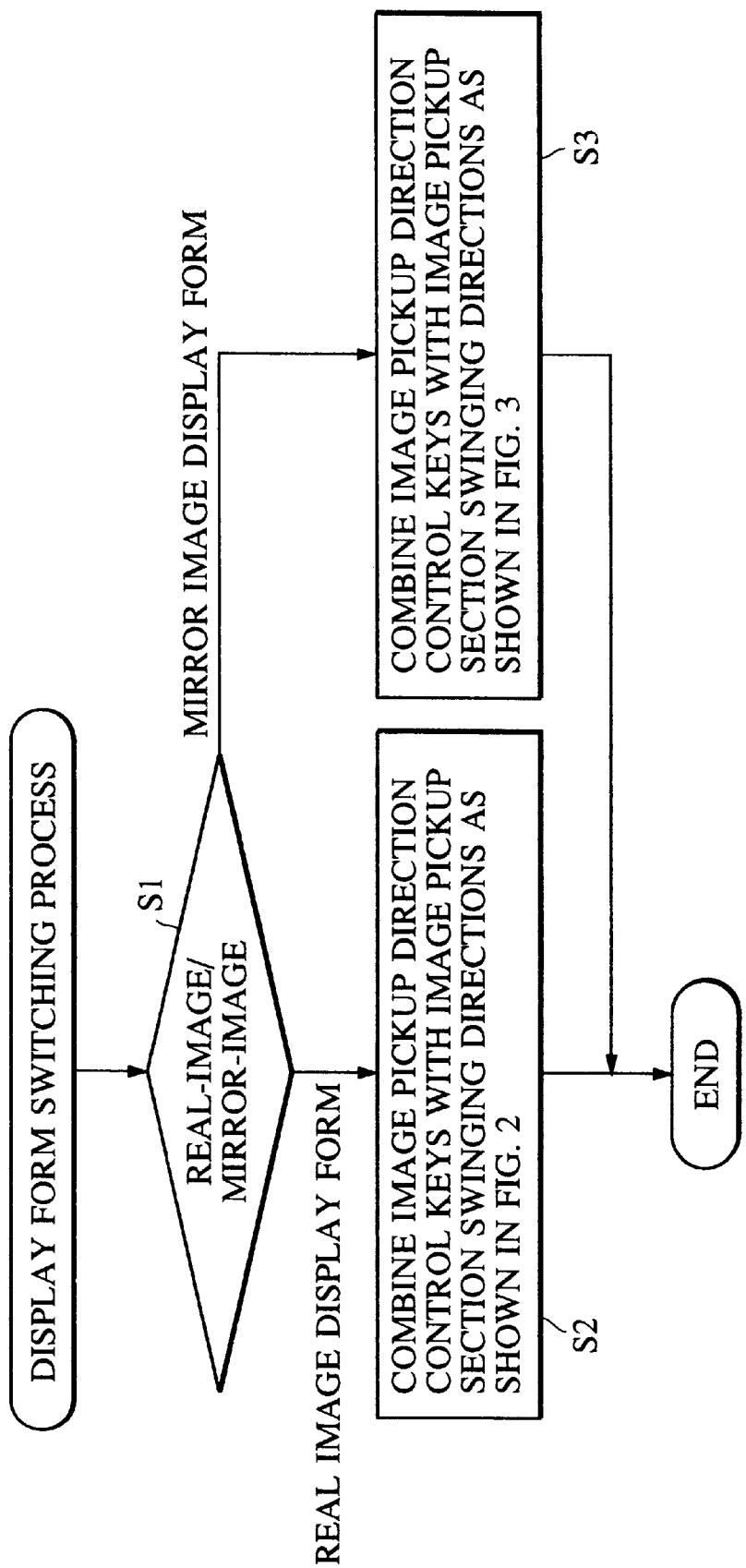

REAL IMAGE
DISPLAY FORM

MIRROR IMAGE
DISPLAY FORM

FIG. 9

| DISPLAY MODE | IMAGE PICKUP MODE<br>KEY DEPRESSED | HUMAN-FIGURE MODE<br>CONTROL COMMAND | CHARACTER/ PICTURE MODE<br>CONTROL COMMAND |
|---|---|---|---|
| REAL IMAGE DISPLAY MODE | LEFT | LEFT | LEFT |
|  | RIGHT | RIGHT | RIGHT |
|  | UP | UP | UP |
|  | DOWN | DOWN | DOWN |
| MIRROR IMAGE DISPLAY MODE | LEFT | RIGHT | RIGHT |
|  | RIGHT | LEFT | LEFT |
|  | UP | UP | UP |
|  | DOWN | DOWN | DOWN |
| CHARACTER/ PICTURE DISPLAY MODE | LEFT | RIGHT | RIGHT |
|  | RIGHT | LEFT | LEFT |
|  | UP | DOWN | DOWN |
|  | DOWN | UP | UP |

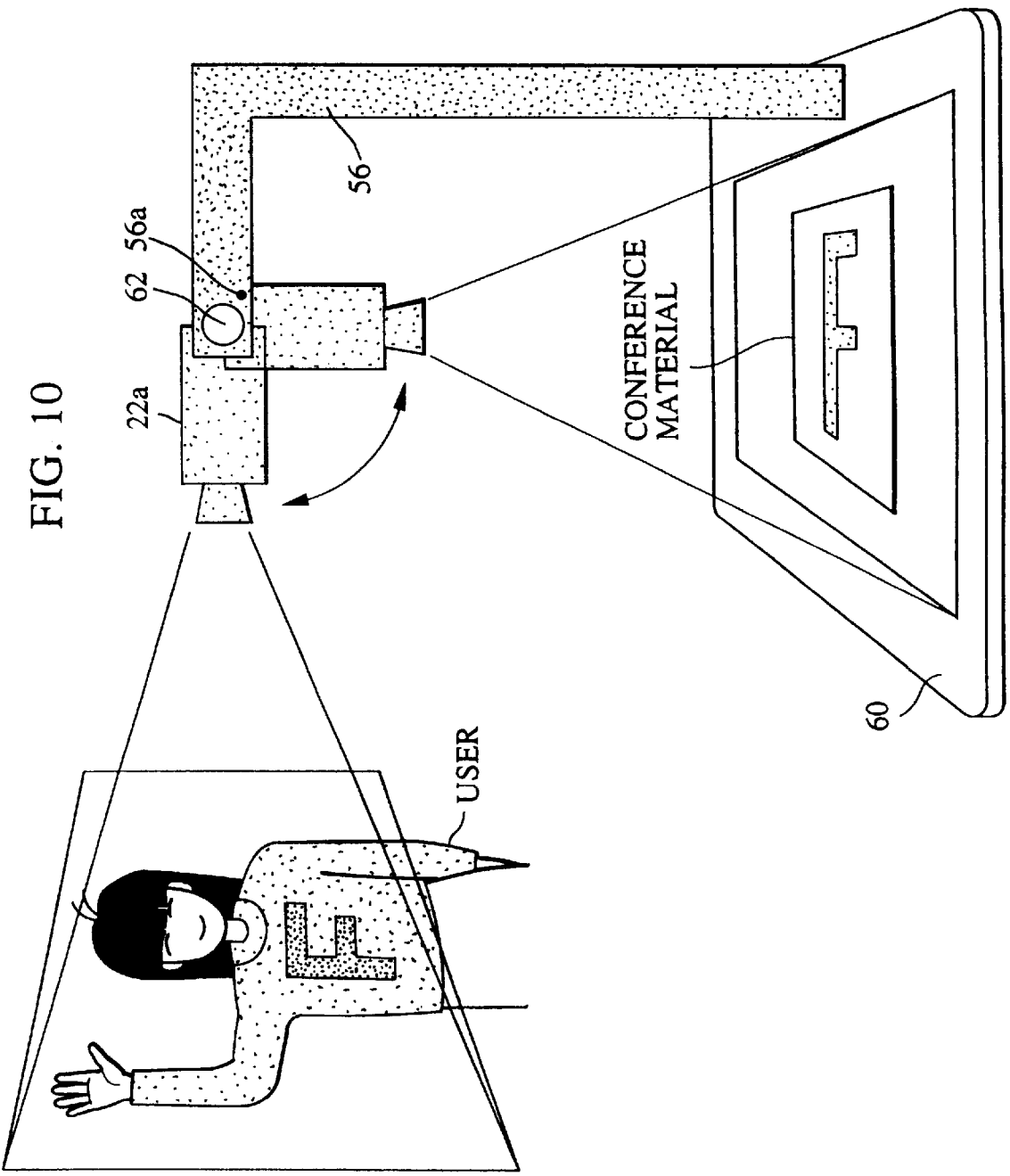

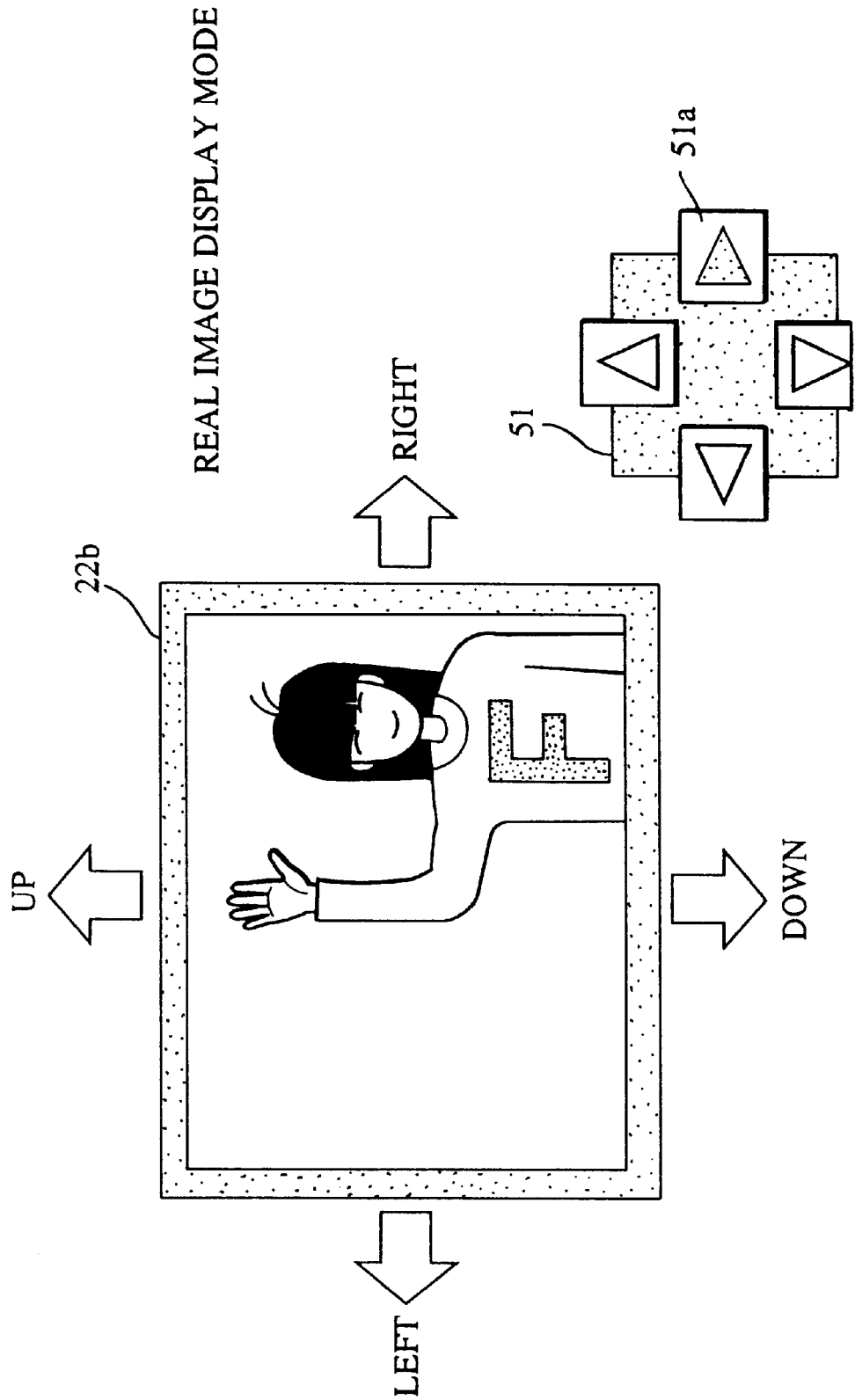

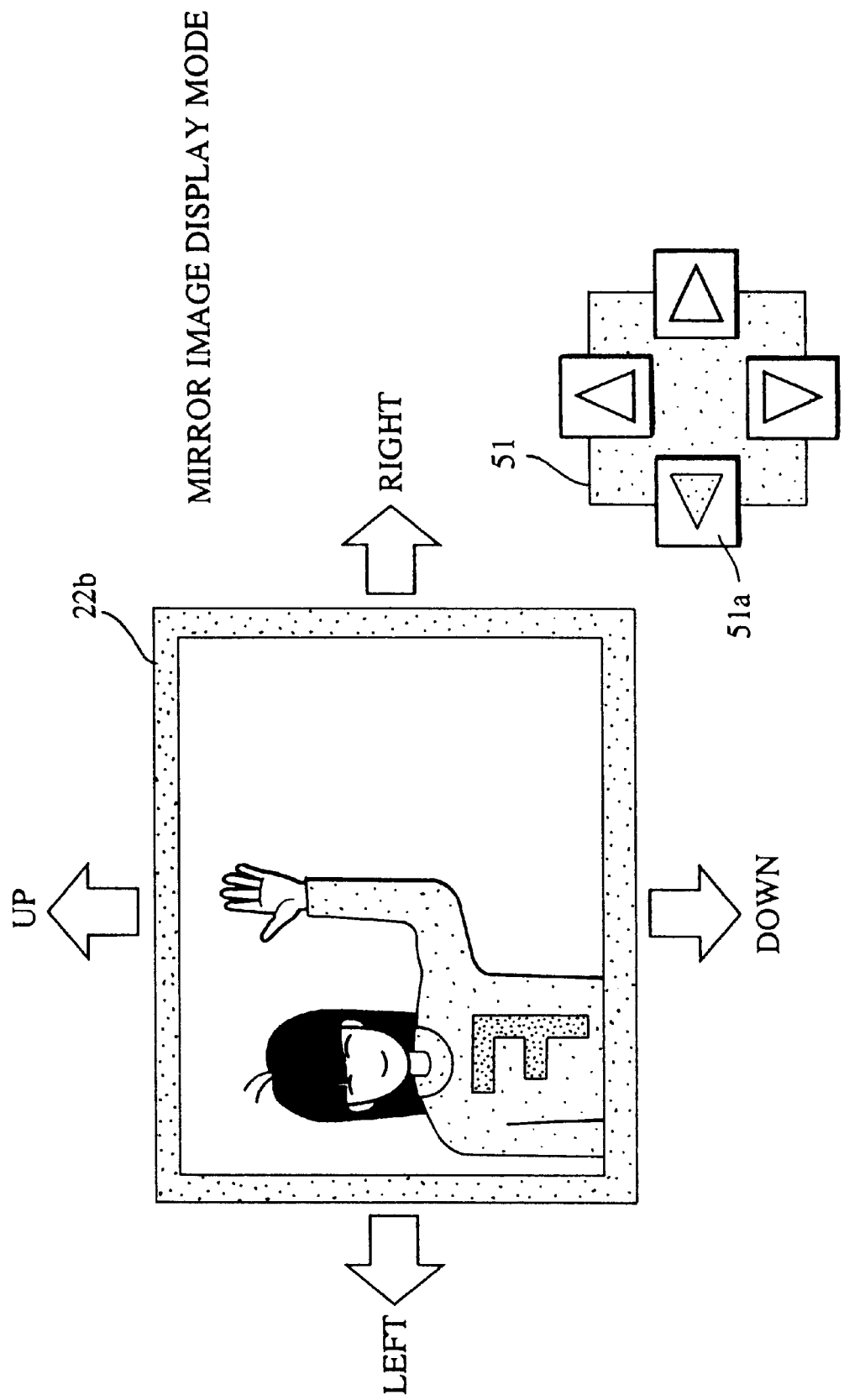

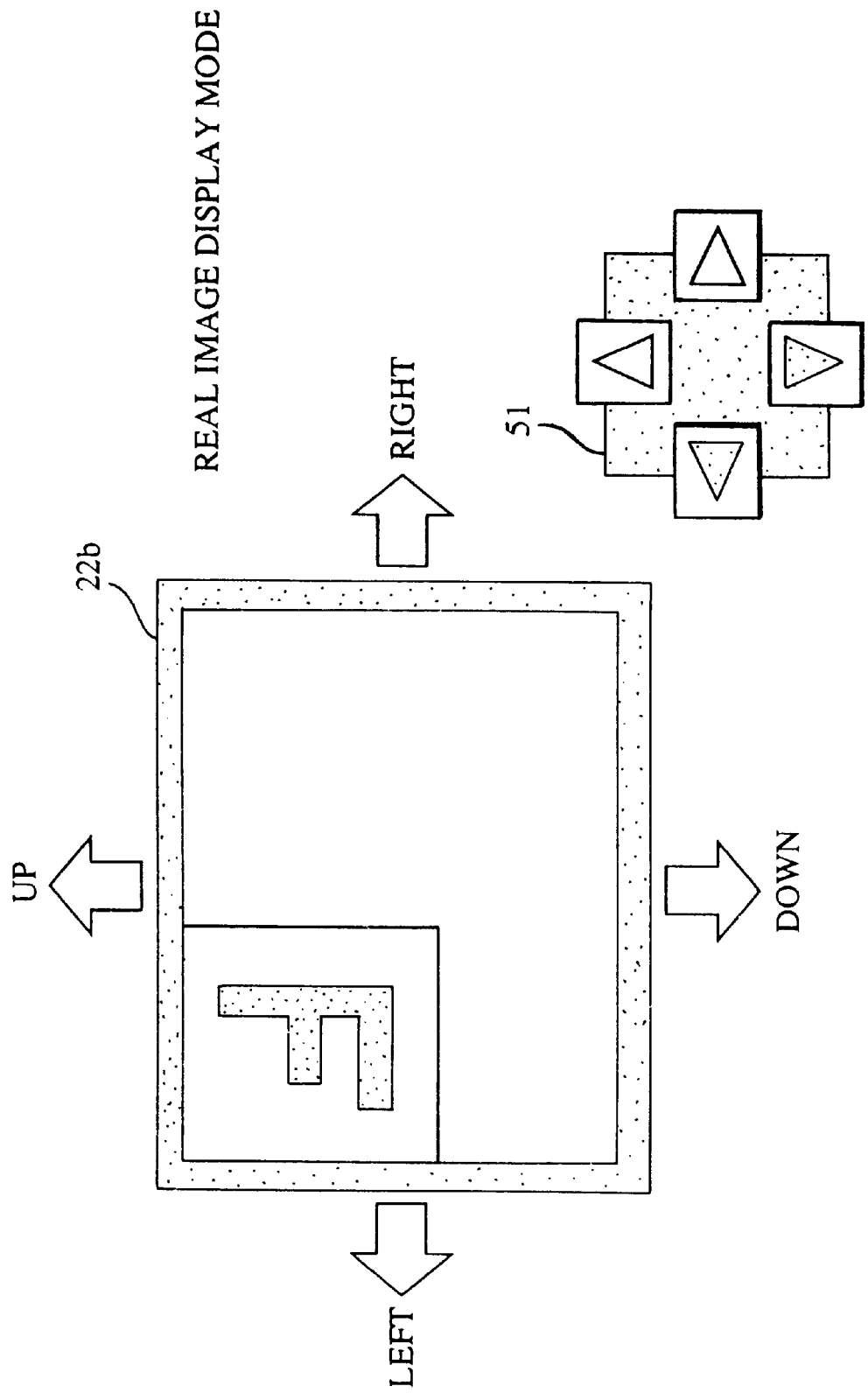

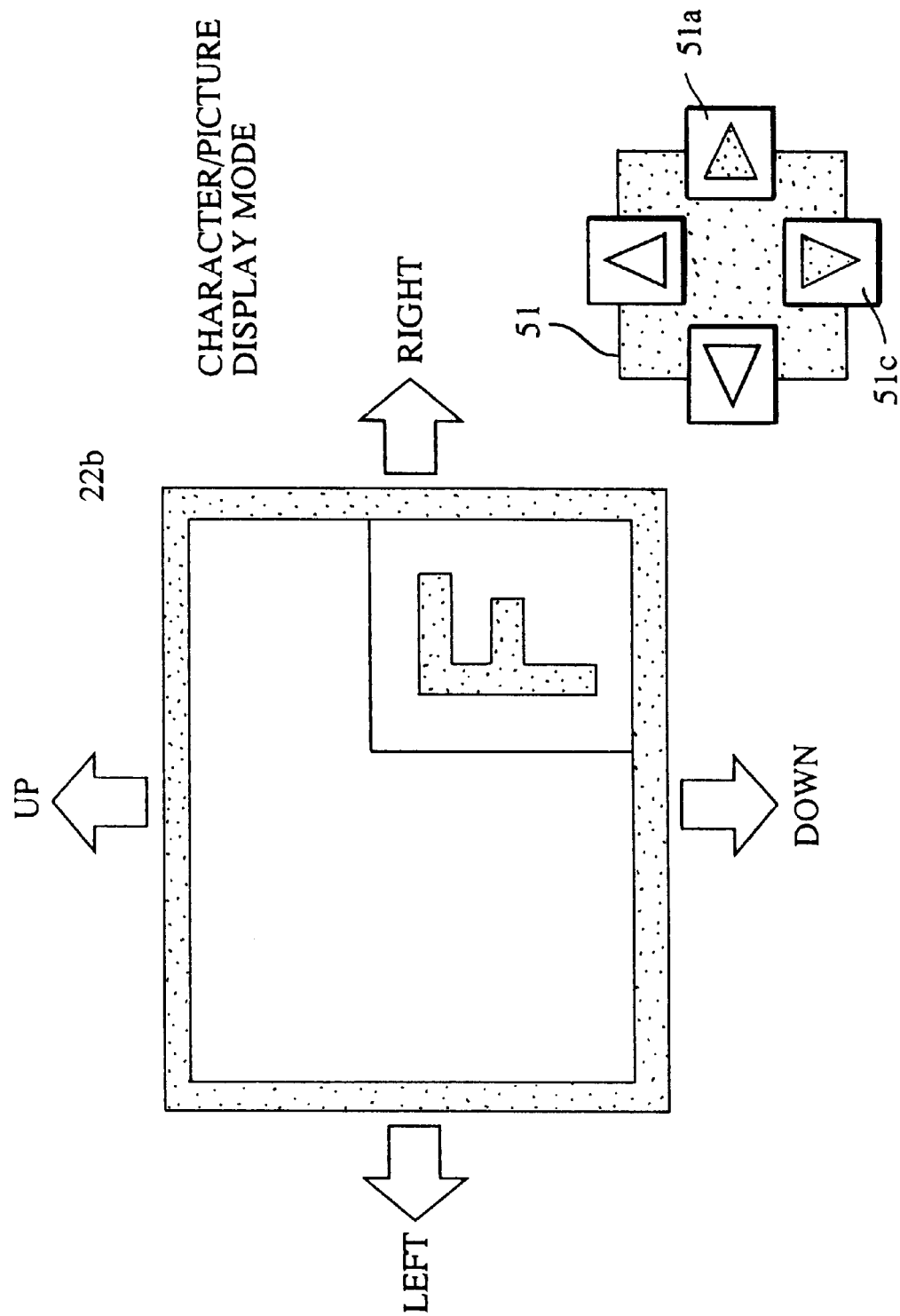

REAL IMAGE DISPLAY FORM

MIRROR IMAGE DISPLAY FORM

IMAGE INPUT SYSTEM HAVING IMAGE PICKUP DEVICE CAPABLE OF MIRROR-DIRECTION PANNING

This application is a continuation of application Ser. No. 08/455,711, filed May 31, 1995, now abandoned.

BACKGROUND OF THE INVENTION

1. Field of the Invention

The present invention relates to an image input system suitable for use in an image communications system for transmitting and receiving images over a distance.

2. Description of the Related Art

Recently, as a result of the development of image compression/encoding techniques and the spread of high-speed/high-quality digital lines (such as ISDN (integrated services digital network)), there are various specific recommendations intended for video/audio services, such as a videoconference system, and various image communications systems that are in conformity with such recommendations are being developed.

Among such image communications systems is an image input apparatus (system) having a means for controlling or adjusting the image pickup direction of a moving image pickup apparatus such as a camera. In this system, an image pickup direction control key, provided on an operation panel, is used to send a control command to a system unit to cause the moving image pickup apparatus to rotate by an angle corresponding to the input control command. By this system, it is possible to control the image pickup direction of not only the image pickup apparatus at the user's end of the line but also the image pickup direction the image pickup apparatus at the other end of the line. The image pickup magnification of the image pickup apparatus can also be controlled in the same way.

When the orientation of the image pickup apparatus is adjusted, an image obtained by this image pickup apparatus is displayed on a display device, and the user operates image pickup direction control keys while watching the displayed image so as to orient the image pickup apparatus in a desired image pickup direction.

In a videoconference system, which is an example of such an image communications systems, the received image may be displayed as it is. However, when displaying a self-image of the user, a mirror image display (which is reversed left to right) is preferable since it is closer to the actual image that the user usually sees. Thus, a display device provided at a terminal of a videoconference system is equipped with a real image display form (mode) for displaying an image unreversed from left to right and a mirror image display form (mode) for displaying an image reversed from left to right.

Thus, when adjusting or controlling the orientation of the image pickup apparatus while watching the taken image displayed on an image display system which is equipped with a real image display form and a mirror image display form, the operation of an image pickup direction control key and the direction of swinging of the image pickup apparatus in response thereto are in a one-to-one correspondence. Thus, the reaction of the displayed image to the operation of an image pickup direction control key when the image is being displayed in the real image display form is reverse to the reaction of the displayed image to the operation of the same image pickup direction control key when the image is being displayed in the mirror image display form.

In more detail, the depression of an image pickup direction control key and the reaction of the image to the depression is in a one-to-one correspondence, as stated above. For example, when the RIGHT key of the image pickup direction control keys is depressed, the image pickup direction is changed to the right, and, when the LEFT key is depressed, the image pickup direction is changed to the left. This leads to a problem in the case of a self-image of the user displayed in the mirror image display form. For example, when the image pickup direction is to be changed to the right as seen from the user while displaying a self image of the user in the mirror image pickup form, the camera, which is directed to the user, has to be turned to the right as seen from the user. To effect this, the camera has to be swung to the left (as seen from the camera), so the user must depress the LEFT key of the image pickup direction control keys. However, the user often erroneously operates the RIGHT key, instead of the LEFT key, since the change to be effected in this case is "to the right" when seen from the user.

This will be specifically explained with reference to FIG. 15. FIG. 15 is a diagram for illustrating such swinging control in the prior art. FIG. 15(A) shows the control when the image is displayed in the real image display form, and FIG. 15(B) shows the control when the image is displayed in the mirror image display form. In either case, a camera 100 takes an image of the same person 102. The image of the person photographed by the camera 100 is displayed as it is on a screen 104 for real image display of FIG. 15(A), whereas the image displayed on a screen 106 for mirror image display (FIG. 15(B)) is reversed from left to right.

In the real image display form, when the image of the person is to be moved toward the center of the screen, a "LEFT" key 110 of image pickup direction control keys 108 is depressed, whereby the camera 100 is swung in the direction indicated by an arrow 114 to thereby cause the image of the person 102 to move toward the center of the screen. This swinging control, effected by the user while watching the image displayed on the screen 104, is well matched with the actual feeling of the user.

Things are different when the image is displayed in the mirror image display form. For example, to move the image of the person 102 which is at the right-hand end of the screen 106 toward the center of the screen, the user is inclined to depress a "RIGHT" key 112 of the image pickup direction control keys 108 since that is closer to the actual feeling of the user. However, if the "RIGHT" key 112 is depressed, the camera 100 is swung to the right (as seen from the camera 100), that is, in the direction indicated by the arrow 116, with the result that the image of the person is further shifted to the right in the screen 106, that is, pushed off the screen 106.

Thus, the control of the image pickup direction of the image pickup apparatus in the prior is not always matched with the actual feeling of the operator, and often leads to confusion.

SUMMARY OF THE INVENTION

The present invention aims to provide an image input system which does not entail the confusion as described above and which allows the direction of the image pickup apparatus to be adjusted in a manner that is matched with the actual feeling of the operator.

To solve the above problem and to achieve the above object, in one aspect of the present invention, there is provided an image input system comprising:

(a) an image pickup section capable of performing image pickup while swinging (panning) at least from side to side;

(b) image pickup direction designating means capable of designating the direction of swinging at least from side to side of the image pickup section;

(c) display form switching means for switching the display form for an image taken by the image pickup section between a real image display form in which the image is displayed unreversed left to right and a mirror image display form in which the image is displayed reversed left to right; and (d) control direction changing means which, when the display form is switched by the display form switching means, changes the correspondence of the designation regarding the swinging direction, given by the image pickup direction designating means, and the direction of swinging in response to the designation.

In another aspect of the present invention, there is provided an image input system comprising:

(a) an image pickup section capable of image pickup while swinging up and down and from side to side;

(b) a support section for supporting the image pickup section in such a way that switching is possible between a first image pickup mode for taking an image of an object placed on a tray and a second image pickup mode for taking an image of an object that is not placed on the tray;

(c) image pickup direction designating for designating the direction of swinging in at least the swinging in up and down and from side to side of the image pickup section;

(d) display mode switching means for switching the display form for an image taken by the image pickup section between a first image display form in which the image is displayed as it is and a second image display form in which the image is displayed reversed top to bottom;

(e) image pickup mode discriminating means for discriminating the image pickup mode of the image pickup section; and (f) control direction changing means which changes the correspondence of the designation regarding the direction of swinging up and down and from side to side, given by the image pickup direction designating means, and the direction of swinging from side to side and up and down of the image pickup section effected in response to the designation.

Other objects of the present invention will become apparent from the following detailed description and the drawings.

BRIEF DESCRIPTION OF THE DRAWINGS

FIGS. 2(A) and 2(B) are diagrams showing a combination of the depression of control keys and the swinging directions of the image pickup section in the embodiment shown in FIG. 1 in the case of the real image display form, of which FIG. 2(A) shows the combination in the form of a table and FIG. 2(B) shows the combination in the form of a drawing;

FIGS. 3(A) and 3(B) are diagrams showing a combination of the depression of control keys and the swinging directions of the image pickup section in the embodiment shown in FIG. 1 in the case of the mirror image display form, of which FIG. 3(A) shows the combination in the form of a table and FIG. 3(B) shows the combination in the form of a drawing;

FIG. 4 is a flowchart illustrating the operation when the display form in the embodiment shown in FIG. 1 is switched;

FIGS. 5(A) and 5(B) are diagrams showing the relationship between the depression of control keys and the swinging directions of the image pickup section in the embodiment shown in FIG. 1, of which FIG. 5(A) shows the relationship in the case of a real image display form and FIG. 5(B) shows the relationship in the case of a mirror image display form;

FIG. 9 is a table showing the control commands to be obtained through the combinations of the image pickup mode and the display mode of the embodiment shown in FIG. 7;

FIG. 10 is a diagram illustrating an example of the operation in the embodiment shown in FIG. 7, showing an image input apparatus used in the embodiment and a human-figure image pickup mode and a character/picture image pickup mode for this image input apparatus;

FIGS. 12(A) and 12(B) are diagrams showing the relationship between the swinging directions and the depression of the image pickup direction control keys in a close-to-actual-feeling manner effected for the purpose of moving a human figure image, taken by the image pickup section of the embodiment shown in FIG. 7 and displayed on the display section, toward the center of the screen, of which FIG. 12(A) shows the relationship in the real image display mode and FIG. 12(B) shows the relationship in the mirror image display mode;

FIGS. 14(A) and 14(B) are diagrams showing the relationship between the swinging directions and the depression of the image pickup direction control keys in a close-to-actual-feeling manner effected for the purpose of moving a character/picture image, taken by the image pickup section of the embodiment shown in FIG. 7 and displayed on the display section, toward the center of the display screen, of which FIG. 14(A) shows the relationship in the real image display mode, and FIG. 14(B) shows the relationship in the mirror image display mode; and FIGS. 15(A) and 15(B) are diagrams for illustrating the swinging control in the conventional example, of which FIG. 15(A) shows the swinging control when the image is displayed in the real image display form, and FIG. 15(B) shows the swinging control when the image is displayed in the mirror image display form.

DESCRIPTION OF THE PREFERRED EMBODIMENTS

An embodiment of the present invention will now be described in detail with reference to the drawings.

Figure 1:
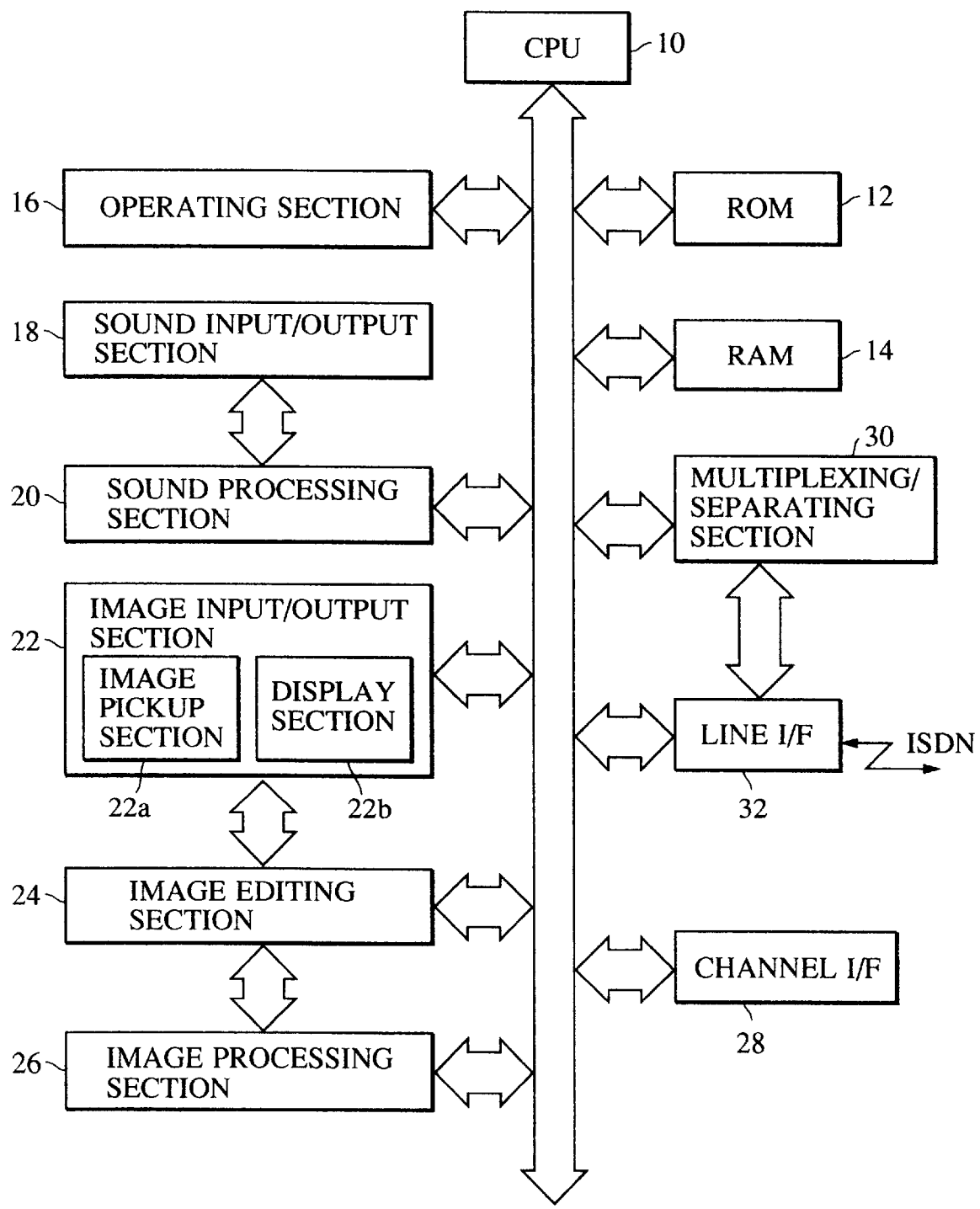
FIG. 1 is a schematic block diagram showing an image input system according to an embodiment of the present invention.

FIG. 1 is a block diagram schematically showing the construction of an image input system according to an embodiment of the present invention. In this embodiment, the image input system functions as a terminal of a videoconference system, which is a form of an image communication system.

A CPU 10 functions so as to control the entire terminal. A ROM 12 stores an image pickup direction switching program, a control direction switching program, and other programs for controlling the videoconference terminal. A RAM 14 is used as a storage area for various kinds of data and as an operating area for the CPU 10. An operating section 16 has input means for inputting control information for controlling video conference, such as a keyboard, a tablet, and a mouse, and, further, image pickup direction control keys 208 (FIGS. 2, 3 and 5).

A sound input/output section 18 is equipped with a handset, a microphone, a speaker, etc. and performs analog/digital and digital/analog conversion of sound signals. A sound processing section 20 performs the encoding of transmission sound signals and the decoding of reception sound signals in accordance with an encoding/decoding algorithm as specified in ITU-T recommendation series G.

An image input/output section 22 has an image pickup section 22a comprising a video camera, a still video camera or the like and a display monitor 22b comprising a CRT monitor or the like, and performs analog/digital and digital/analog conversion of image signals. An image editing section 24 performs image processing operations, such as window display, filtering, and the synthesis of character data and/or figure data, and, further, an image processing of images taken by the image pickup section 22a, for example, the flipping from side to side of the images. An image processing section 26 performs the encoding of images to be transmitted and the decoding of received images in accordance with an algorithm as specified in ITU-T (International Tele-communication Union-Tele-communication) recommendation H.261.

A channel interface 28 is used to connect an external apparatus, such as a personal computer, to the system. A multiplexing/separating section 30 performs a multiplexing operation for multiplexing sound signals from the sound processing section 18, image signals from the image processing section 26, image pickup direction control commands for the display section of the terminal at the other end of the line, which are generated in accordance with instructions from the operating section 16, and various kinds of data signals input through the channel interface 28, the multiplexing being effected in transmission-frame units in accordance with the current communication capacity and the current communication mode. The multiplexing/separating section 30 further performs a separating operation for separating the reception frame into construction-unit media and informing the sound processing section 18, the image processing section 26, the image pickup section 22a, and the channel interface 28 of the separation. A line interface 32 is connected to an ISDN line and performs line control in accordance with ISDN-user/net interface.

In this embodiment, the operating section 16, which includes image pickup direction control keys 208, and the CPU 10 constitute image pickup direction designating means; the operating section 16 and the CPU 10 constitute display form switching means; and the CPU 10, the ROM 12 and RAM 14 constitute control direction changing means. The ROM 12 and RAM 14 are used as needed.

FIGS. 2(A) and 2(B) are diagrams showing a combination of the image pickup direction control keys 208 and the swinging directions of the image pickup section 22a in the case in which a self image is displayed in the real image display form on the display section 22b. FIG. 2(A) shows the combination in the form of a table, and FIG. 2(B) shows the combination in the form of a drawing. In this case, as in the prior-art example, the image pickup section 22a is swung (panned) to the left in response to the depression of a LEFT key 210 of the image pickup direction control keys 208, as indicated by an arrow 212; the image pickup section 22a is swung (panned) to the right in response to the depression of a RIGHT key 214, as indicated by an arrow 216; the image pickup section 22a is swung (tilted) upwards in response to the depression of an UP key; and the image pickup section 22a is swung (tilted) downwards in response to the depression of a DOWN key.

FIGS. 3(A) and 3(B) are diagrams showing a combination of the image pickup direction control keys 208 and the swinging directions of the image pickup section 22a in the case in which a self image is displayed in the mirror image display form on the display 22b. FIG. 3(A) shows the combination in the form of a table, and FIG. 3(B) shows the combination in the form of a drawing. In this case, the image pickup section 22a is swung to the right in response to the depression of the LEFT key 210 of the image pickup direction control keys 208, as indicated by an arrow 218; the image pickup section 22a is swung to the left in response to the depression of the RIGHT key 214, as indicated by an arrow 220; the image pickup section 22a is swung upwards in response to the depression of the UP key; and the image pickup section 22a is swung downwards in response to the depression of the DOWN key. The swinging directions when the LEFT key 210 and the RIGHT key 214 are depressed are reverse to those in the case of the real image display form, shown in FIG. 2.

FIG. 4 is a flowchart showing the relationship between the selection or change of display form and the correspondence table showing the correspondence of the image pickup direction control keys 208 and the swinging directions of the image pickup section 22a and the correspondence tables (FIGS. 2(A) and 3(A). The display form switching operation is conducted as follows: Since the operator selects the display form between the real image display form and the mirror image display form by means of the operating section 16, a judgment is made as to whether the display form is the real image display form or the mirror image display form (S1). When the display form is switched to the real image display form, the combination of the image pickup direction control keys 208 and the swinging directions of the image pickup section 22a is set as shown in FIG. 2 (S2). When the display form is switched to the mirror image display form, the combination of the image pickup direction control keys 208 and the swinging directions of the image pickup section 22a is set as shown in FIG. 3 (S3). The above-mentioned tables are stored in the ROM 12, and the selected table is first read into the RAM 14 and a series of processing operations are conducted by the CPU 10.

Figure 5A:
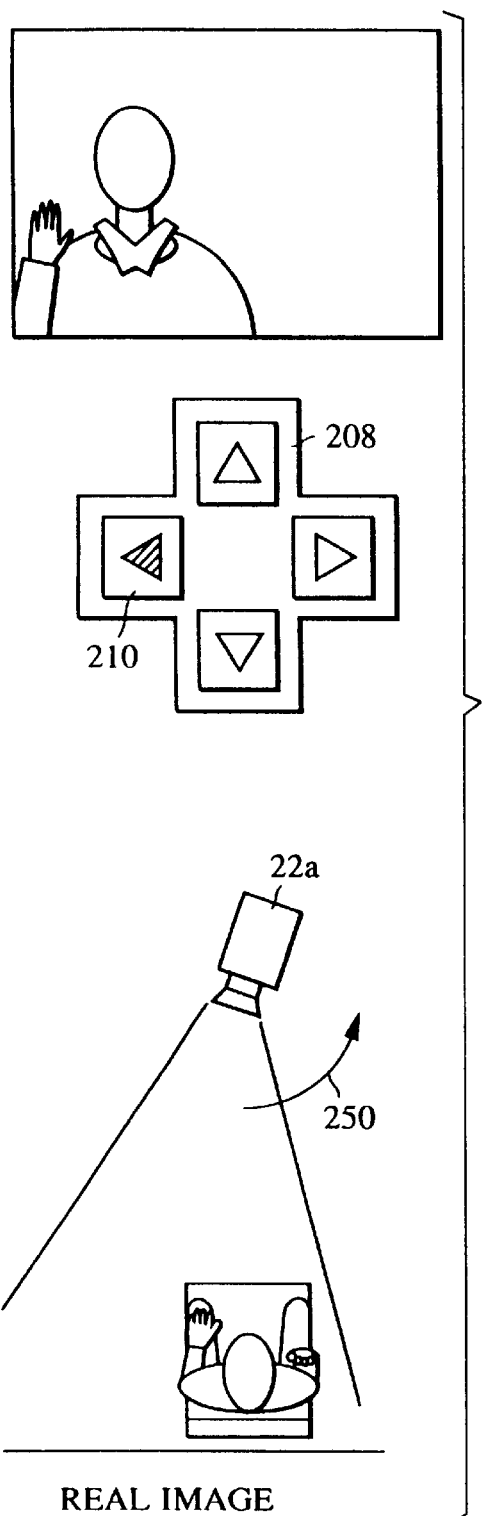
Figure 5B:
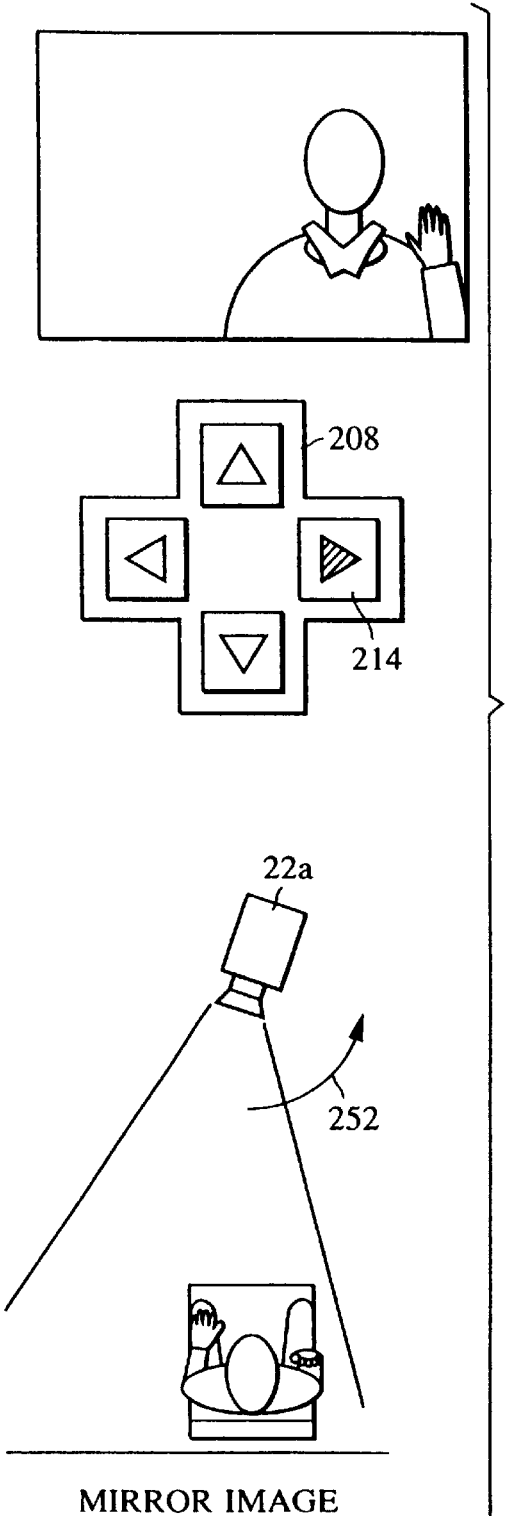

FIG. 5 (comprising FIGS. 5(A) and 5(B)) is a diagram showing the relationship between the depression of the image pickup direction control keys 208 and the actual swinging directions of the image pickup section 22a in this embodiment. Portion (A) of the drawing shows the relationship in the case of the real image display form, and portion (B) of the drawing shows the relationship in the case of the mirror image display form. In the case of the real image display form, depression of the LEFT key 210 of the image pickup direction control keys 208 causes the image pickup section 22a to swing to the left as indicated by the arrow 250. In the case of the mirror image display form, depression of the RIGHT key 214 of the image pickup direction control keys 208 causes the image pickup section 22a to swing to the right, which is the same direction as in the case of the real image display form (the arrow 252).

In the above-described embodiment, whichever of the real image display form and the mirror image display form is selected as the display form for a self image, it is possible to control the image pickup direction in a manner which is matched with the actual feeling of the operator. That is, to effect a change in image pickup direction of the image pickup section in a manner matched with the actual feeling, the operator has only to depress the image pickup direction control key corresponding to the desired direction while watching the image displayed on the display section, regardless of the image display form selected.

While the above embodiment has been described mainly with reference to a case in which an image of a human figure is taken, in a videoconference system, which is one form of image communication system, the object whose image is to be taken by the image pickup section may also be conference material used in the conference as well as the figures of the users using the terminals of the videoconference system. In the following, an image input system will be described in which the above two types of objects constitute the object of image pickup.

Figure 6:
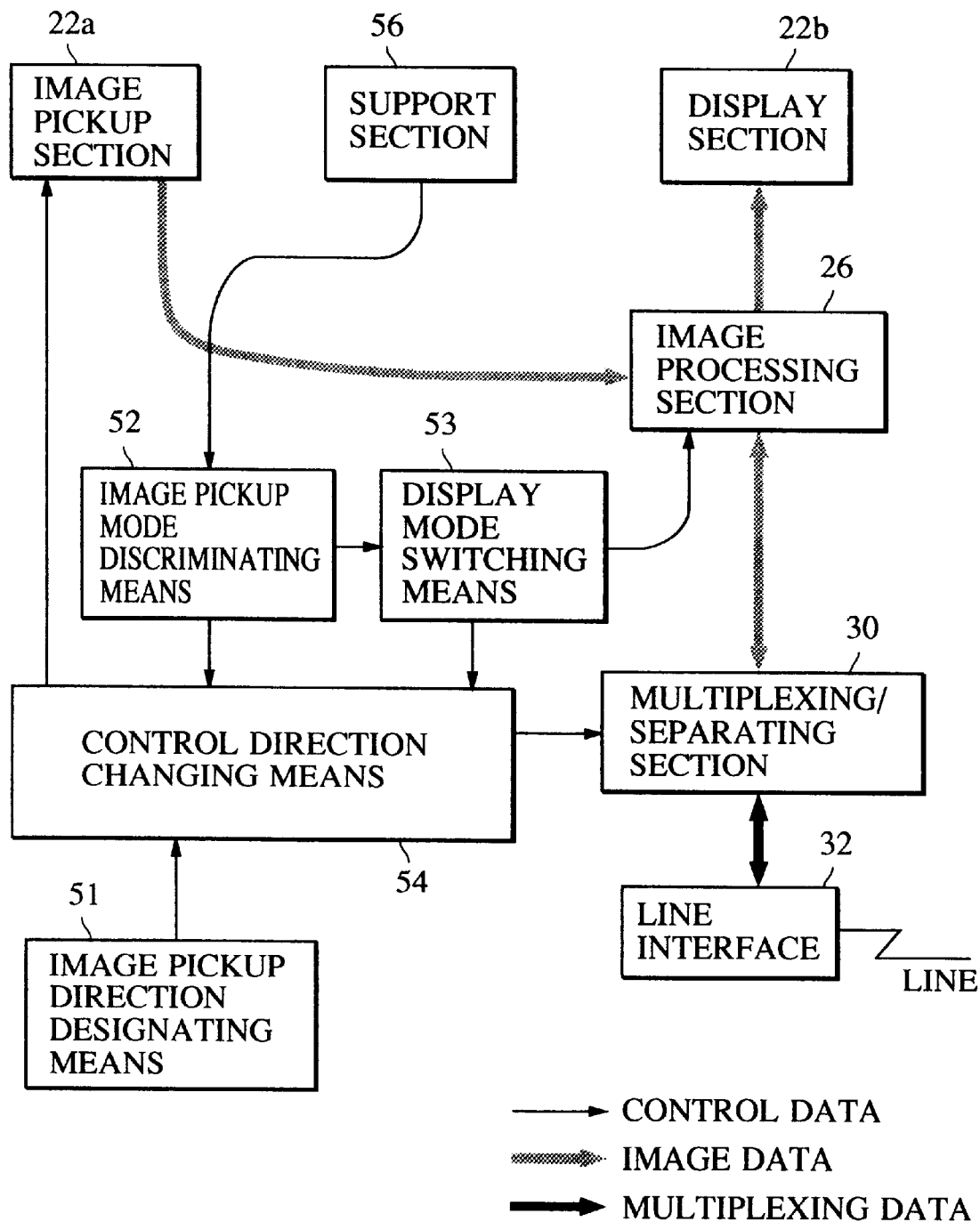
FIG. 6 is a schematic diagram showing the function of an image input system according to another embodiment of the present invention.

FIG. 6 is a block diagram showing an example the functional system configuration of this image input system. The components having the same functions as those of the embodiment shown in FIG. 1 are indicated by the same reference numerals.

The image input system of this embodiment is equipped with an image pickup direction designating means 51, an image pickup mode discriminating means 52, a display mode switching means 53, a control direction changing means 54, an image pickup section 22a, a support section 56, a display section 22b, an image processing section 26, a multiplexing/separating section 30, and a line interface 32.

The image pickup direction designating means 51 designates changing to the left or right, or upwards or downwards, of the image pickup direction of the image pickup section 22a. The image pickup mode discriminating means 52 serves to discriminate whether the image pickup section 22a is in the character/picture image pickup mode (the first image pickup mode) or the human-figure image pickup mode (the second image pickup mode) from the condition of the image pickup section 22a supported by the support section 56. In this embodiment, each time the condition in which the image pickup section 22a is supported by the support section is changed, the image pickup mode after the change is discriminated by the image pickup mode discriminating means 52.

When displaying the image taken by the image pickup section 22a on the display section 22b, the display mode switching means 53 switches between three modes: a mode in which the image taken is displayed as it is (a real image display mode, which is the first display mode), a mode in which the image is displayed reversed from top to bottom (a character/picture display mode, which is the second display mode), and a mode in which the image is displayed reversed left to right (a mirror image display mode, which is the third display mode). In this embodiment, the display mode switching means 53 automatically switches the display mode of the display section 22b to the real image display mode when the image pickup mode is the human-figure image pickup mode, or to the character/picture display mode when the image pickup mode is the character/picture image pickup mode, on the basis of the image pickup mode discriminated by the image pickup mode discriminating mode 52. In this embodiment, there is provided a means (e.g., a display mode switching key) for selecting the mirror image display mode as the display mode of the display section 22b when the image pickup mode of the image pickup section is the human figure image pickup mode, and it is also possible to switch the display mode in response to instructions from this means.

The control direction changing means 54 serves to convert the image pickup direction control instructions in horizontal and vertical directions from the image pickup direction instructing means 51 to appropriate instruction commands regarding the swinging in horizontal and vertical directions on the basis of the combination of the current image pickup mode discriminated by the image pickup mode discriminating means 52 and the current display mode set by the display mode switching means 53.

Next, the specific construction and operation of the image input system of this embodiment will be described in more detail with reference to the drawings.

Figure 7:
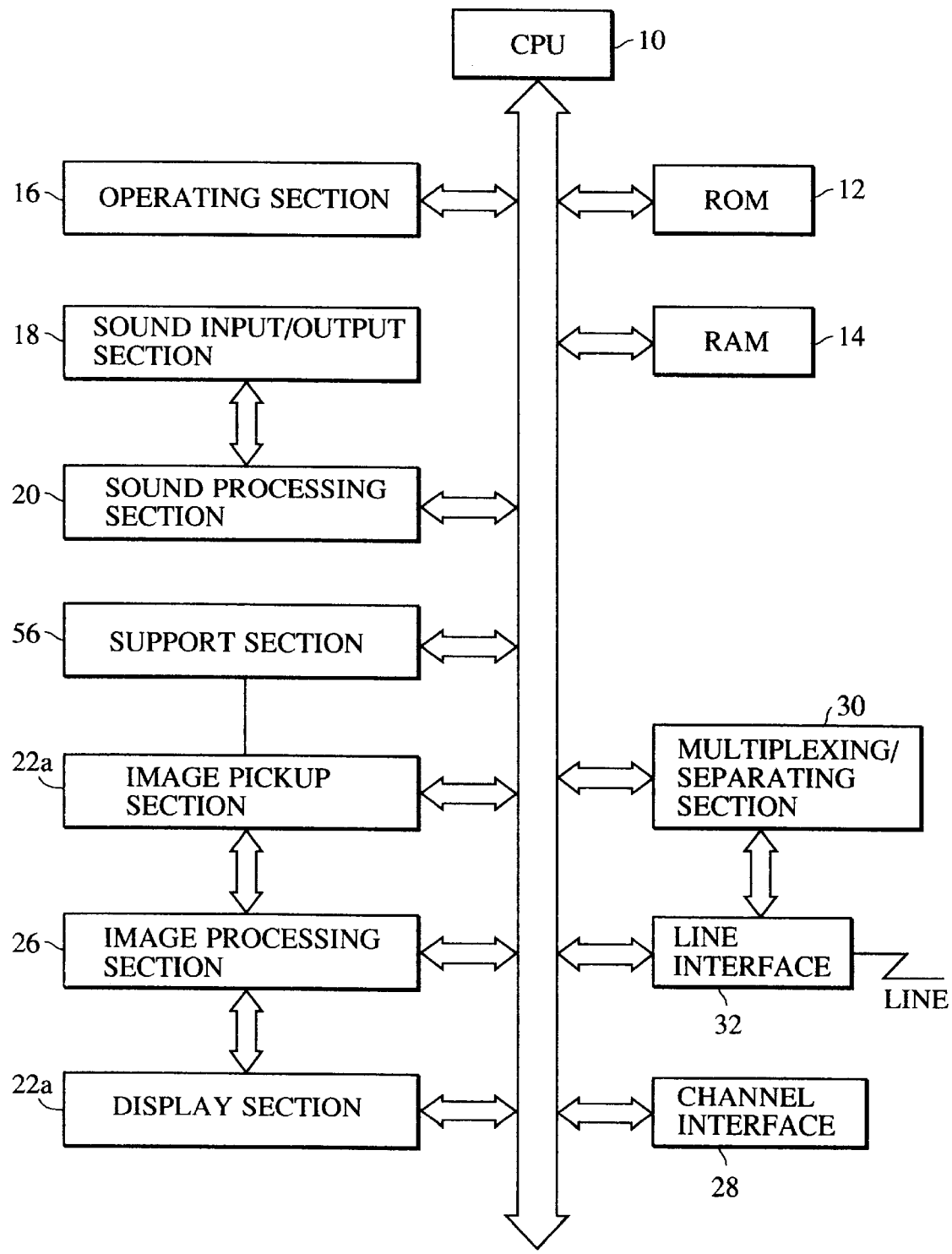
FIG. 7 is a block diagram showing the construction of an image input system according to another embodiment of the present invention in detail.

FIG. 7 is a block diagram showing the construction of an embodiment of the image input system more specifically. In FIG. 7, the components which have functions that are the same as those of the embodiment shown in FIG. 1 are indicated by the same reference numerals and a description of such components will be omitted. In the following, those functions of this embodiment with which the above-described embodiment was not endowed will be mainly described.

The ROM 12 stores, in addition to what has been mentioned with reference to the above embodiment, programs for the image pickup mode discriminating means and the display mode switching means. The operating section 16 also has the image pickup direction control key 51 of FIG. 6. As shown in FIG. 10, the support section 56 is provided in an upright posture on a document tray 60 to support the image pickup section 22a, and has a function by which it switches the image pickup direction of the image pickup section 22a by means of a rotating section 62. The image pickup section 22a is capable of performing image pickup in the character/picture image pickup mode for taking an image of an object on the document tray 60 and in the human-figure image pickup mode for taking an image of an object placed at a position other than on the document tray 60, and can be controlled in swinging in the horizontal and vertical directions by instructions supplied from the operating section 16 through CPU 10 or instructions from the CPU 10 only. The image processing section 26 has the function of the image editing section 24 in addition to that of the above-described embodiment. Accordingly, in this embodiment, the image editing section 24 can be omitted. Further, this embodiment has a character/picture image pickup mode, so it also performs a top-to-bottom inversion processing, etc. The display section 22b displays image signals received from the image processing section 26.

In this embodiment, the operating section 16, including the image pickup direction control keys 208, and the CPU 10 constitute the image pickup direction designating means 51; the CPU 10 or a combination of the operating section 16 and the CPU 10 constitutes the display mode switching means; a position sensor 56a (FIG. 10) and the CPU 10 constitute the image pickup mode discriminating means; and the CPU 10 constitutes the control direction changing means. The ROM 12 and the RAM 14 are used as needed.

Next, the operation of this embodiment will be described with reference to the flowchart shown in FIG. 8.

First, the current position of the image pickup section 22a on the support section 56 is checked by the position sensor 56a (S 10). On the basis of the checking result, the CPU 10

(the image pickup mode discriminating means 52) makes a judgment as to whether the image pickup mode is the human-figure image pickup mode or not (S 11). If it is the human-figure image pickup mode, the fact that the current image pickup mode is the human-figure taking mode is stored in the RAM 14 (S12). If it is not the human-figure image pickup mode, the current image pickup mode is stored in the RAM 14 as the character/picture image pickup mode (S 13).

Next, the current display mode of the display section 22b, set by the CPU 10 (the display mode switching means 53), is discriminated (S 14). On the basis of the discrimination result, a judgment is made as to whether the display mode is the real image display mode or not (S 15). When the display mode is the real image display mode, the fact that the current display mode is the real image display mode is stored in the RAM 14 (S 16). When the display mode is not the real image display mode, a judgment is made as to whether the current display mode is the mirror image display mode or not (S 17). When current mode of the display section is the mirror image display mode, the fact that the current display mode is the mirror image display mode is stored in the RAM 14 (S 18). When the display mode is not the mirror image display mode, the current display mode is stored in the RAM 14 as the character/picture display mode (S19).

The CPU 10 (the control direction changing means 54) determines an appropriate swinging direction of the image pickup section 22a corresponding to the depression of the image pickup direction key 51 from the combination of the image pickup mode and the display mode stored in the RAM 14 (S 20). The determined swinging direction of the image pickup section 22a is issued to the image pickup section 22a as the swinging control command, with which this processing is completed.

Figure 8:
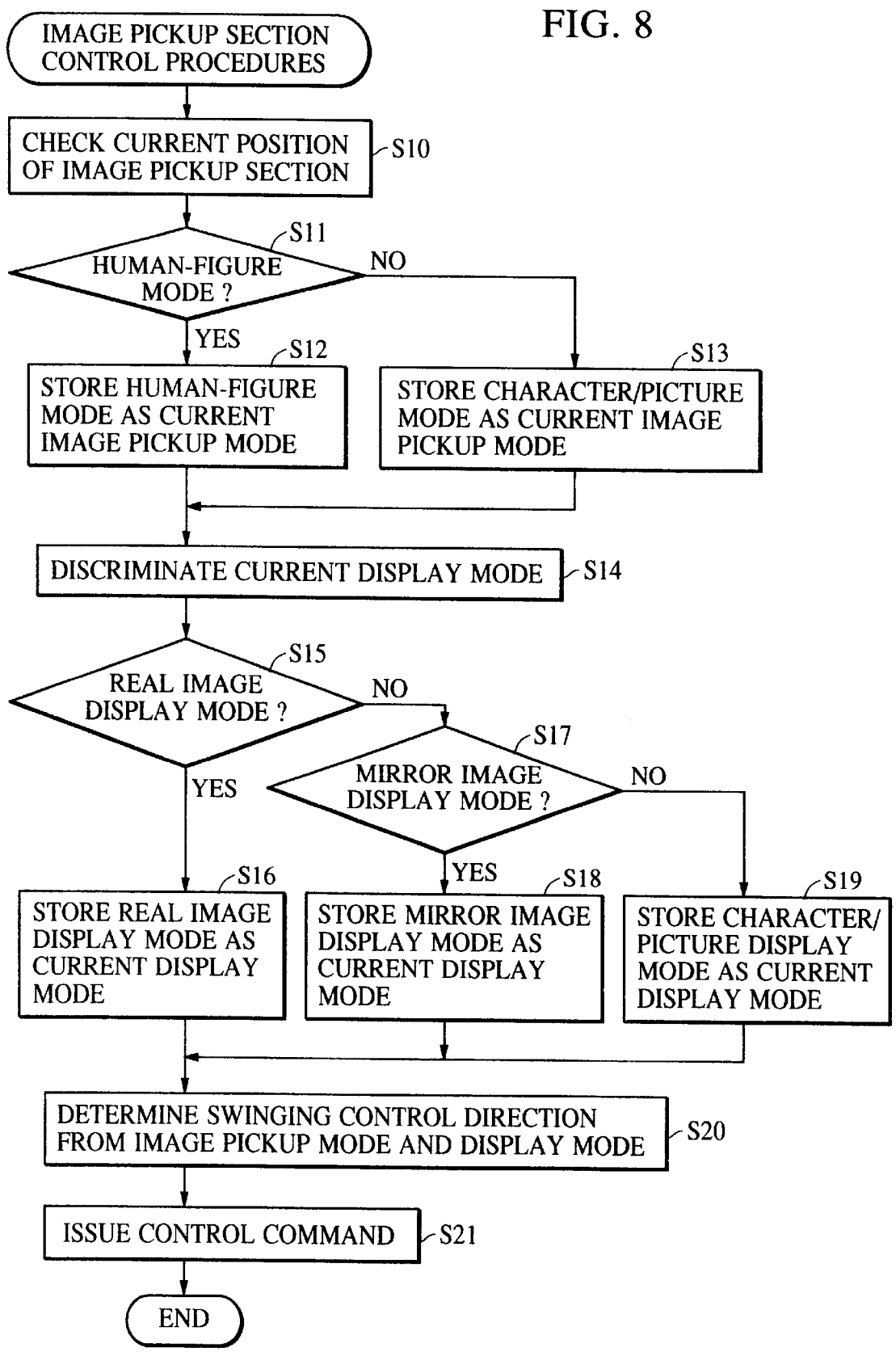
FIG. 8 is a flowchart showing an example of the processing operation when the depression of the image pickup direction control keys of the embodiment shown in FIG. 7 is executed.

The table shown in FIG. 9 is an example of the image pickup direction conversion table used for the purpose of determining the swinging direction control command for the image pickup section 22a corresponding to the image pickup direction control key 51 depressed, in accordance with the combination of the image pickup mode of the image pickup section 22a and the display mode of the display section 22b, in step S 20 of the flowchart shown in FIG. 8. In the table, when the image pickup mode of the image pickup section 22a is the human-figure image pickup mode, and the display mode of the display section 22b is the real image display mode, the depression of the image pickup direction control key 51 and the image pickup direction control command corresponding thereto are as shown in the table of FIG. 9. That is, when the LEFT key of the image pickup direction control keys 51 is depressed, a "LEFT" control command is issued to the image pickup section 22a. Similarly, when the RIGHT key is depressed, a "RIGHT" command is issued; when the UP key is depressed, an "UP" command is issued; and when the DOWN key is depressed, a "DOWN" command is issued.

When the image pickup mode of the image pickup section 22a is the character/picture image pickup mode, and the display mode of the display section 22b is the character/picture display mode, the depression of the image pickup direction control keys 51 and the image pickup direction control command corresponding thereto are as shown in the table of FIG. 9. That is, when the LEFT key of the image pickup direction control keys 51 is depressed, a "RIGHT" control command is issued to the image pickup section 22a. Similarly, when the RIGHT key is depressed, a "LEFT" command is issued; when the UP key is depressed, a "DOWN" command is issued; and when the DOWN key is depressed, an "UP" command is issued.

Similarly, with respect to every combination of the image pickup mode of the image pickup section 22a and the display mode of the display section 22b, reference to this table makes it possible to issue an appropriate swinging control command in response to the depression of the image pickup direction control key 51.

Next, an example of the operation when the above system is used will be specifically described with reference to FIGS. 10 through 14.

As shown in FIG. 10, the support section 56 is provided in an upright posture on the document tray 60. At the forward end of the support section, the image pickup section 22a is rotatably supported by means of the rotating section 62. Thus, when the image pickup section 22a is locked by some locking means (not shown), it is possible to perform image pickup in two modes: the character/picture image pickup mode, in which an image of an object on the document tray 60 can be taken, and the human-figure image pickup mode, in which an image of an object placed at a position other than on the document tray 60 can be taken. By detecting the position of the image pickup section 22a on the support section 56 by the position sensor 56a, it is possible to discriminate the current image pickup mode. When the above-mentioned locking means also serves as this position sensor 56a, the position sensor 56 can be omitted.

Figure 11:
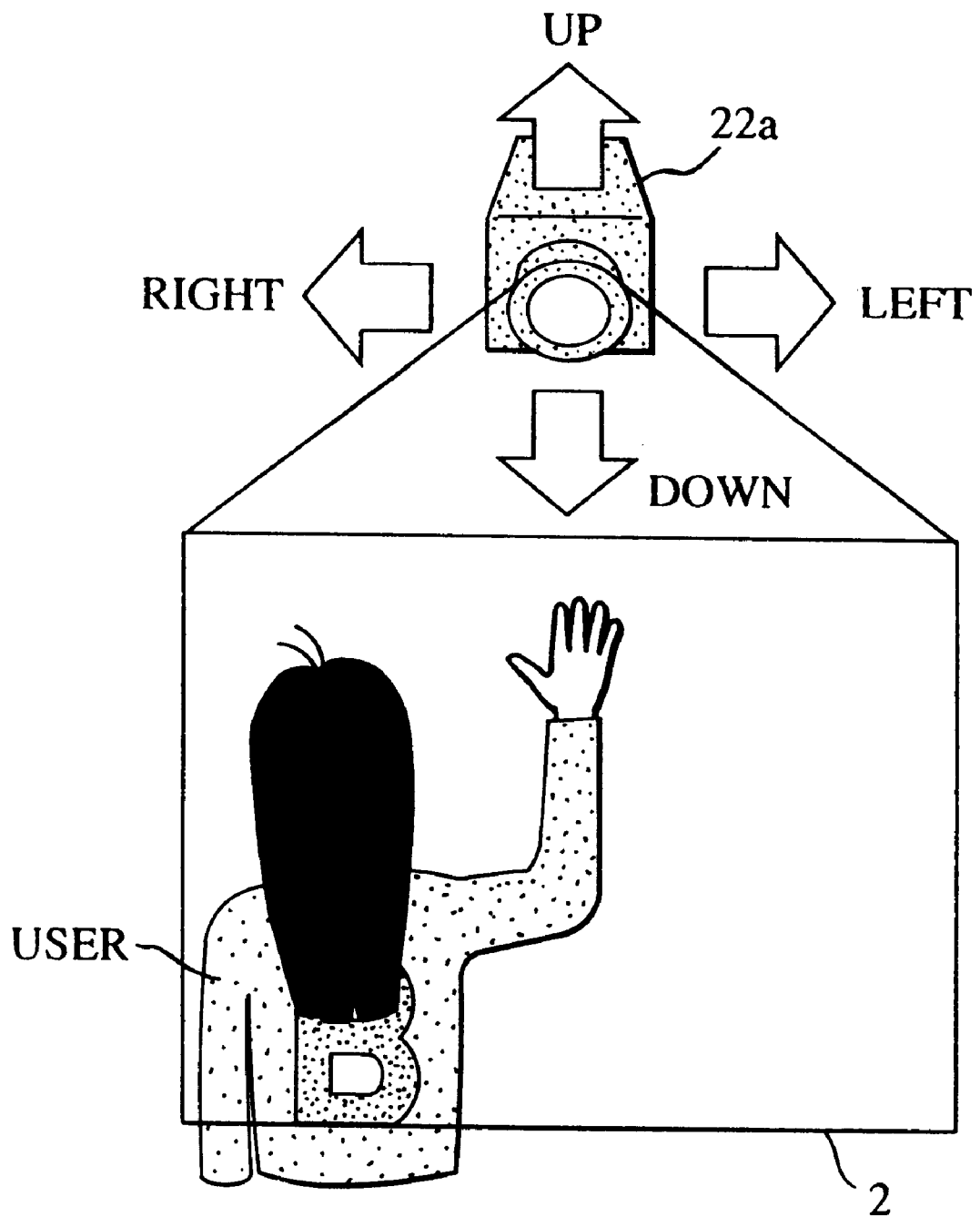
FIG. 11 is a diagram showing the swinging directions of the image pickup section of the embodiment shown in FIG. 7 in the human-figure image pickup mode.

FIG. 11 shows the swinging directions (vertical and horizontal) of the image pickup section 22a of a videoconference terminal, constructed as described above, when it is in the human-figure image pickup mode, and an image pickup frame 2 for indicating the range taken in as an image. In FIG. 11, when the image pickup frame 2 is shifted to the right, that is, when the image pickup direction of the image pickup section 22a is shifted to the right, it is possible to bring the object to the center of the image pickup frame 2.

The image taken can be displayed on the display section 22b of the terminal at the user-side end of the line in two display forms: a real image display form in which, as shown in FIG. 12(A), the image taken is displayed as it is; and a mirror image display form in which, as shown in FIG. 12(B), the image taken is displayed reversed left to right. To move the image of the object displayed on the display section 22b toward the center of the display screen, the user of the videoconference terminal is usually inclined to move the image of the human figure toward the center of the screen by moving the frame of the display screen, as in the case of FIG. 11, in which the image frame 2 is moved. That is, when the display form of the display section 22b is the real image display form, the user of the videoconference terminal is inclined to depress the RIGHT key 51a of the image pickup direction control keys 51 for controlling the image pickup direction of the image pickup section 22a, and, when the display form is the mirror image display form, the user is inclined to depress the LEFT key 51b of the image pickup direction control keys 51. In the case of the real image display form, the combination of the human-figure image pickup mode and the real image display mode of the conversion table shown in FIG. 9 is selected, so that, by depressing the RIGHT key 51a of the image pickup direction control keys 51, the image pickup section 22a is swung to the right in FIG. 11. In the case of the mirror image display form, the combination of the human-figure image pickup mode and the mirror image display mode of the conversion table shown in FIG. 9 is selected, so that, by depressing the LEFT key 51b of the image pickup direction control keys 51, the image pickup section 22a is swung to the right in FIG. 11. Thus, in either case, the image pickup direction control keys 51 can be operated so as to move the image of the object toward the center of the screen in the same feeling as when moving the image frame.

Figure 13:
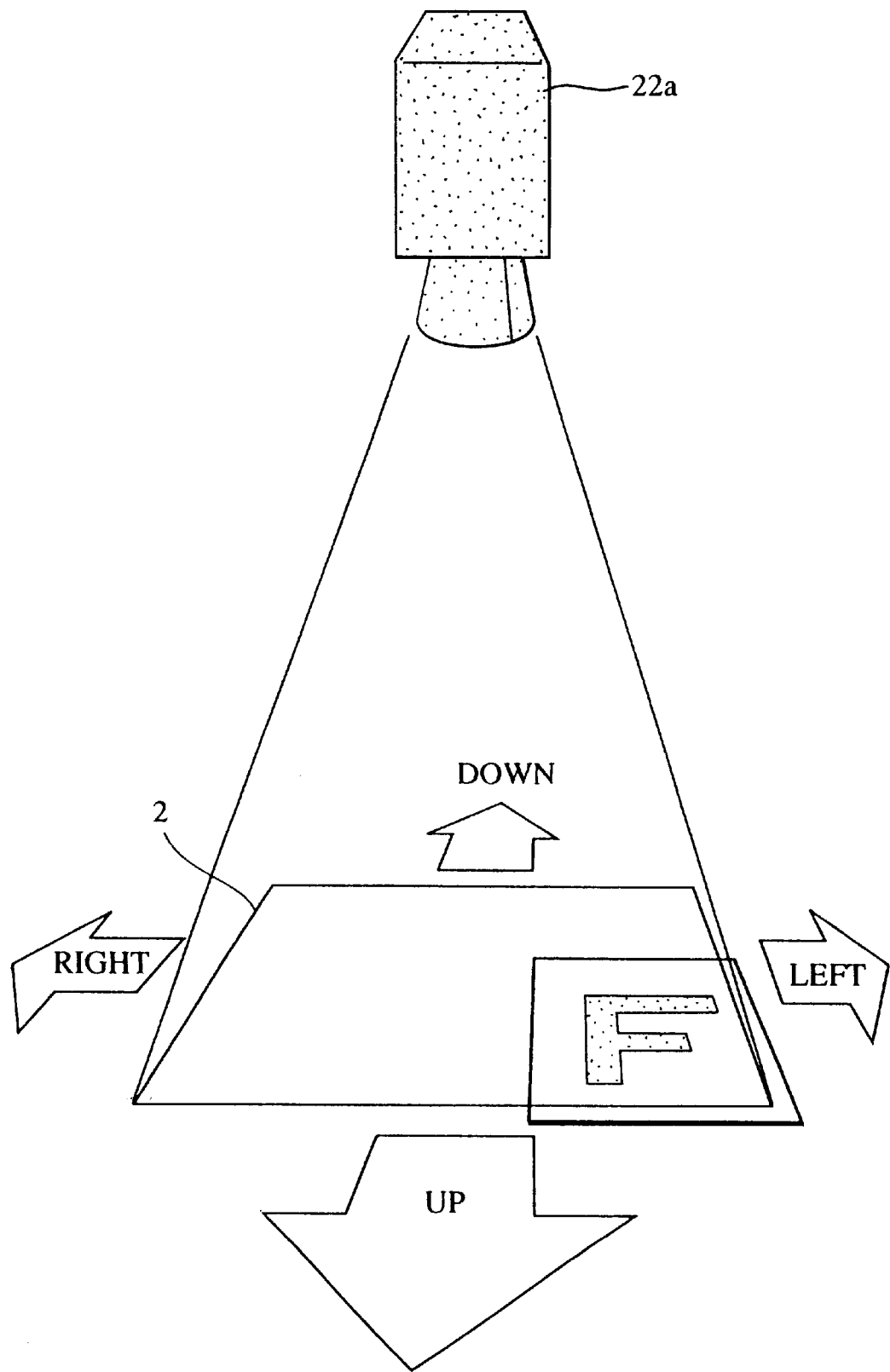
FIG. 13 is a diagram showing the swinging directions of the image pickup section of the embodiment of FIG. 7 when in the character/drawing image pickup mode.
Figure 15A:
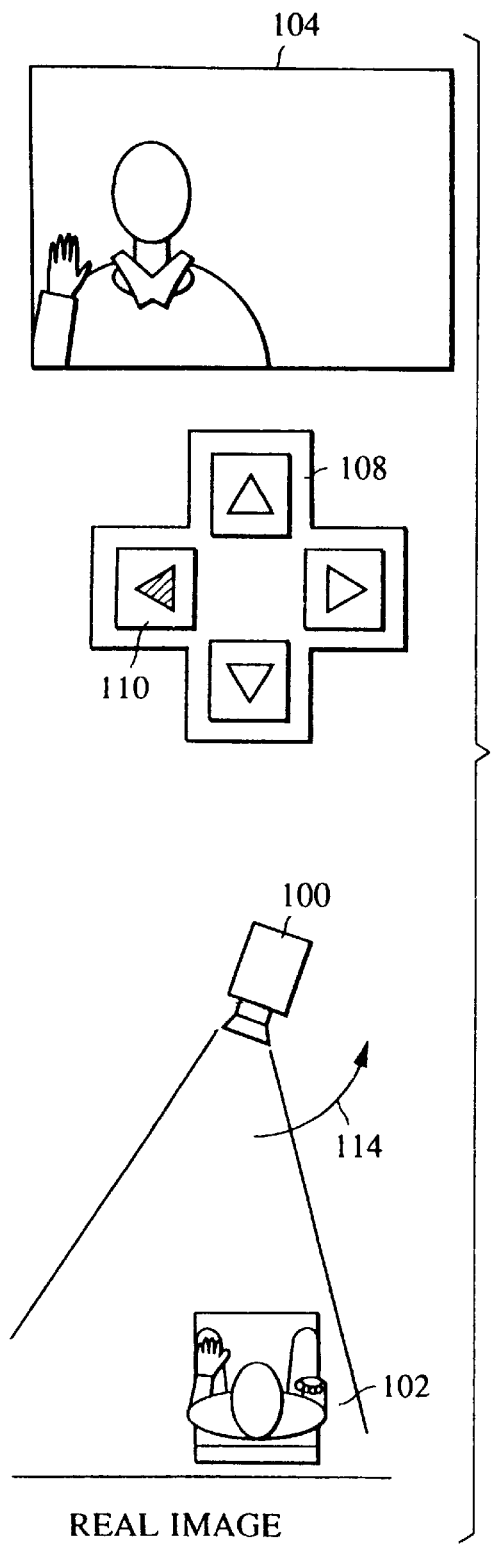
Figure 15B:
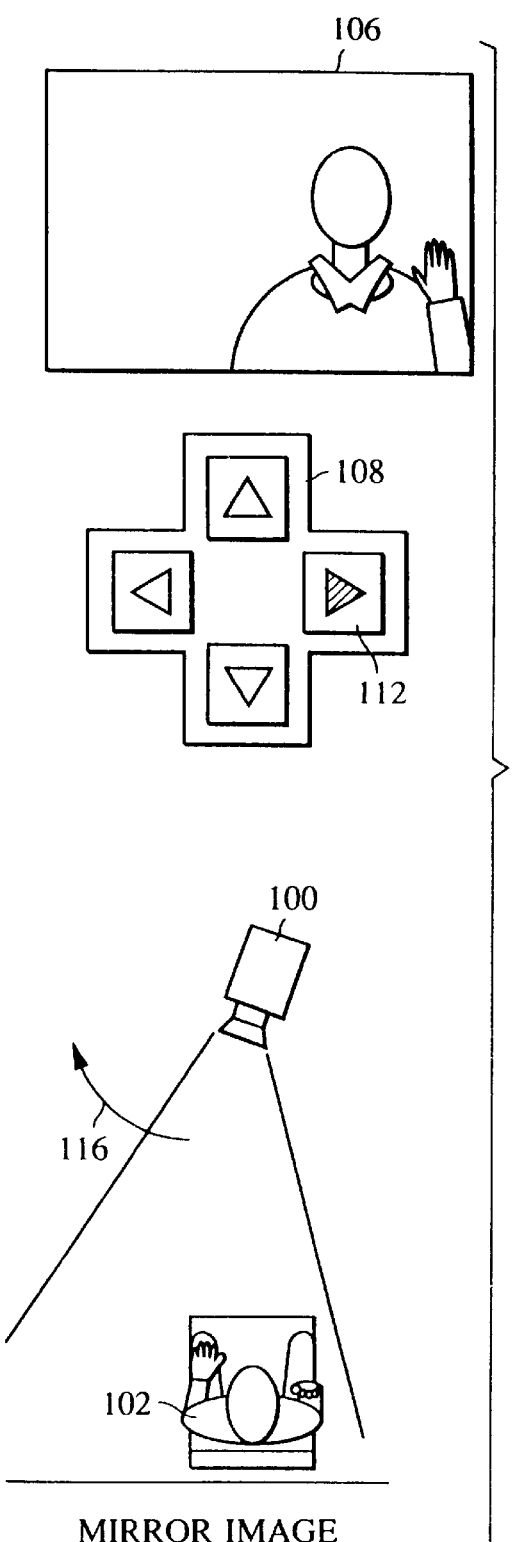

Next, the case in which the character/picture image pickup mode is selected will be described with reference to FIGS. 13 and 14. FIG. 13 shows the swinging direction of the image pickup section 22a and the range taken in as an image in the case of an operation in the character/picture image pickup mode shown in FIG. 10. In this case, if the image taken by the image pickup section 22a is displayed as it is on the display device as in the case of the real image display form used for the image taken in the human-figure image pickup mode of FIG. 10, an image reversed top to bottom as shown in the real image display form (mode) of FIG. 14(A) will be displayed. In view of this, when an image taken in the character/picture image pickup mode is to be displayed as shown in the character/picture display form (mode) of FIG. 14(B), the image is displayed reversed top to bottom. In this case, when the object (the letter F) is to be brought to the center of the screen, it is necessary for the image pickup direction control keys 51 to be operated so as to shift the image pickup frame to the right and downwards. In this embodiment, the swinging direction control command for the image pickup section 22a is obtained through the combination of the character/picture image pickup mode and the character/picture display mode of the table shown in FIG. 9, so that, by operating the RIGHT key 51a in FIG. 14(B), the image pickup section 22a is swung to the left in FIG. 13. Similarly, by operating the DOWN key 51c, the image pickup section 22a is swung upwards. Thus, the image of the object can be brought to the center of the screen by operating the image pickup direction control keys 51 with the same feeling as when moving the image frame.

As described above, in this embodiment, it is possible to perform an image pickup direction control which is matched with the actual feeling of the operator, regardless of the combination of the image pickup mode of the image pickup section and the display mode of the display section.

While the above embodiments have been described with reference to a case in which ISDN is utilized as the communications line, the present invention is applicable not only to ISDN but also to various other lines, such as PSTN (analog telephone network), CSPDN (circuit switching network), and LAN (local area network).

As can be easily understood from the above description, in accordance with this embodiment, it is possible to control the image pickup direction in a manner which is matched with the actual feeling of the user whichever of the real image display form and the mirror image display form is selected as the display form for a self image. That is, by operating the image pickup direction designating means in the direction in which the user desires to move the image while watching the image displayed on the display section, it is possible to change the image pickup direction of the image pickup section in a way matched with the feeling of the user.

The same effect as described above can also be obtained with an image input apparatus which can assume at least two image pickup modes: a first image pickup mode in which an image of an object on the tray is taken and a second image pickup mode in which an object placed at a position other than on the tray is taken.

Further, although it is possible to construct an image input system without a display section, provision of a display section makes the image input system closer to perfection.

Further, provision of a line interface enables the image input system to be easily utilized as an image communication system.

The individual component shown in outline or designated by blocks in the Drawings are all well-known in the image pickup arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image input system comprising:
   (a) an image pickup means for picking up an image of an object and being movable from side to side;
   (b) image pickup direction designating means for designating a direction of movement of the image pickup means;
   (c) display form switching means for switching a display form for the image picked up by the image pickup means between a first image display form in which the image is displayed as it is, and a second image display form in which the image is displayed reversed left-to-right; and
   (d) control direction changing means which, when the display form is switched by the display form switching means, changes the correspondence between (i) the designation regarding the direction of movement from side to side, given by the image pickup direction designating means, and (ii) the direction of side to side movement, in response to the designation.

2. An image input system according to claim 1, further comprising a display for displaying images picked up by said image pickup means.

3. An image input system according to any one of claims 1 and 2, further comprising a line interface for connecting said system to a communication line.

4. An image input system according to claim 1, wherein said control direction changing means has a correspondence table relating (i) the designation of the direction of movement from side to side, given by the image pickup direction designating means, and (ii) the direction of movement from side to side in response to the designation.

5. An image input system according to claim 4, further comprising a ROM storing said correspondence table.

6. An image input system comprising:
   (a) an image pickup means for picking up an image of an object and being movable up-and-down and from side-to-side;
   (b) a support means for supporting the image pickup means such that switching is possible between a first image pickup mode for picking up an image of an object placed on a base, and a second image pickup mode for taking an image of an object that is not placed on said base;
   (c) image pickup direction designating means for designating the direction of movement up-and-down and from side-to-side of the image pickup means;
   (d) display mode switching means for switching the display form for an image picked up by the image pickup means between a first image display form in which the image is displayed as it is and a second image display form in which the image is displayed reversed top-to-bottom;

(e) image pickup mode discriminating means for discriminating the image pickup mode of the image pickup means; and (f) control direction changing means which changes the correspondence between (i) the designation regarding the direction of movement up and down and from side to side, given by the image pickup designating means, and (ii) the direction of up-and-down and side-to-side movement effected, in response to the designation.

7. An image input system according to claim 6, further comprising a display for displaying images picked up by said image pickup means.

8. An image input system according to any one of claims 6 and 7, further comprising a line interface for connecting said system to a communication line.

9. An image input system according to claim 6, wherein said control direction changing means has a correspondence table relating (i) the designation regarding the direction of movement up and down and from side to side, given by the image pickup direction designating means, and (ii) the direction of movement up and down and from side to side in response to the designation.

10. An image input system according to claim 9, further comprising a ROM storing said correspondence table.

11. An image input system according to claim 6, wherein said display mode switching means is further capable of being switched to a third display mode for displaying an image picked up by said image pickup means in which the image is displayed reversed left to right.

12. An image input system according to claim 6, wherein said image pickup mode discriminating means has a sensor for detecting the position of said image pickup means on said support means.

13. A method for controlling an image pickup device movable from side-to-side, comprising the steps of:

designating a direction of movement of the image pickup device;

switching a display form for the image picked-up by the image pickup means between (i) a first image display form in which the image is displayed as it is, and (ii) a second image display form in which the image is displayed reversed left-to-right; and changing the correspondence between (i) the designation regarding the direction of movement from side-to-side, given by the designating step, and (ii) the direction of side-to-side movement, in response to the designation when the display form is switched in the switching step.

14. A method for controlling an image pickup device movable up-and-down and from side-to-side, comprising the steps of:

designating a direction of movement up-and-down and from side-to-side of the image pickup device;

switching the display form for an image picked-up by the image pickup device between (i) a first image display form in which the image is displayed as it is, and (ii) a second image display form in which the image is displayed reversed top-to-bottom;

discriminating the image pickup mode of the image pickup device; and changing the correspondence between (i) the designation regarding the direction of movement up-and-down and from side-to-side, given by the designating step, and (ii) the direction of up-and-down and side-to-side movement effected, in response to the designation.

15. A computer-readable storage medium having instructions for causing a computer to control an image pickup device which is movable from side-to-side, the storage medium instructions causing the computer to perform the steps of:

designating a direction of movement of the image pickup device;

switching a display form for the image picked-up by the image pickup means between (i) a first image display form in which the image is displayed as it is, and (ii) a second image display form in which the image is displayed reversed left-to-right; and changing the correspondence between (i) the designation regarding the direction of movement from side-to-side, given by the designating step, and (ii) the direction of side-to-side movement, in response to the designation when the display form is switched in the switching step.

16. A computer-readable storage medium having instructions for causing a computer to control an image pickup device which is movable up-and-down and from side-to-side, the storage medium instructions causing the computer to perform the steps of:

designating a direction of movement up-and-down and from side-to-side of the image pickup device;

switching the display form for an image picked-up by the image pickup device between (i) a first image display form in which the image is displayed as it is, and (ii) a second image display form in which the image is displayed reversed top-to-bottom;

discriminating the image pickup mode of the image pickup device; and changing the correspondence between (i) the designation regarding the direction of movement up-and-down and from side-to-side, given by the designating step, and (ii) the direction of up-and-down and side-to-side movement effected, in response to the designation.

* * * * *

UNITED STATES PATENT AND TRADEMARK OFFICE
CERTIFICATE OF CORRECTION

PATENT NO.   :   5,970,162

DATED        :   October 19, 1999

INVENTOR(S)  :   MASANORI KAWASHIMA

It is certified that error appears in the above-identified patent and that said Letters Patent is hereby corrected as shown below:

<u>COLUMN 1</u>
Line 43, "systems," should read --system,--.

<u>COLUMN 6</u>
Line 34, "3(A)." should read --3(A)).--.

<u>COLUMN 7</u>
Line 22, "the" should read --of the--.

Signed and Sealed this

Fourteenth Day of November, 2000

Attest:

Q. TODD DICKINSON

*Attesting Officer*     *Director of Patents and Trademarks*